United States Patent [19]

Dave et al.

[11] Patent Number: 4,682,340
[45] Date of Patent: Jul. 21, 1987

[54] APPARATUS FOR AND METHOD OF EXTRACTING AN OUTPUT BEAM FROM A LASER SYSTEM

[75] Inventors: Timothy A. Dave, Mountain View; Steve Guch, Jr., Saratoga, both of Calif.

[73] Assignee: GTE Government Systems Corporation, Stamford, Conn.

[21] Appl. No.: 851,985

[22] Filed: Apr. 14, 1986

Related U.S. Application Data

[63] Continuation-in-part of Ser. No. 814,448, Dec. 30, 1985, abandoned.

[51] Int. Cl.[4] .............................................. H01S 3/08
[52] U.S. Cl. .................................... 372/108; 372/105; 372/99; 372/93
[58] Field of Search .................... 372/108, 105, 99, 98, 372/93, 97

[56] References Cited

U.S. PATENT DOCUMENTS 4,441,186  4/1984  Erickson .............................. 372/26

OTHER PUBLICATIONS

Hon, "Pulse Compression by Stimulated Brillowin Scattering", Optics Lett., vol. 5, No. 12, Dec. 1980, p. 516.

Primary Examiner—Leon Scott, Jr.
Attorney, Agent, or Firm—Douglas M. Gilbert; John F. Lawler

[57] ABSTRACT

The output of a laser oscillator is doubly passed through a birefringement medium, a quarter-wave plate and a laser amplifier by reflection from a phase conjugate mirror, the birefringent medium being between the oscillator and the plate in the path of the initial and reflected oscillator output. The birefringent medium divides the oscillator output into a first set of orthogonal polarization components (rays) and refracts one of them at a first angle successively through the plate and amplifier for reflection from the mirror through the amplifier, plate and medium. The reflected ray is amplified and then divided by the medium into a second set of orthogonal ray components which exit the medium at different angles away from the oscillator. In another embodiment, a second quarter-wave plate is added between the amplifier and mirror, and in a third embodiment the amplifier is positioned between the oscillator and the birefringent medium. These designs represent a unique means of separating in angle the oscillator input beam and the phase-conjugated/amplified beam. This results in a physical positional separation of the two, which allows the latter beam to be readily extracted and utilized in a useful fashion, and prevents potentially damaging reflections from being fed back into the oscillator.

15 Claims, 5 Drawing Figures

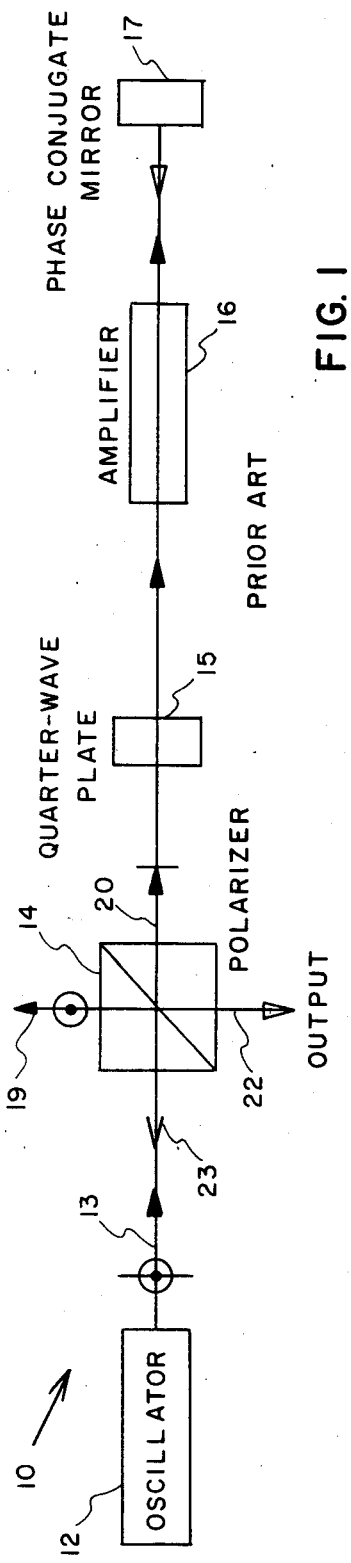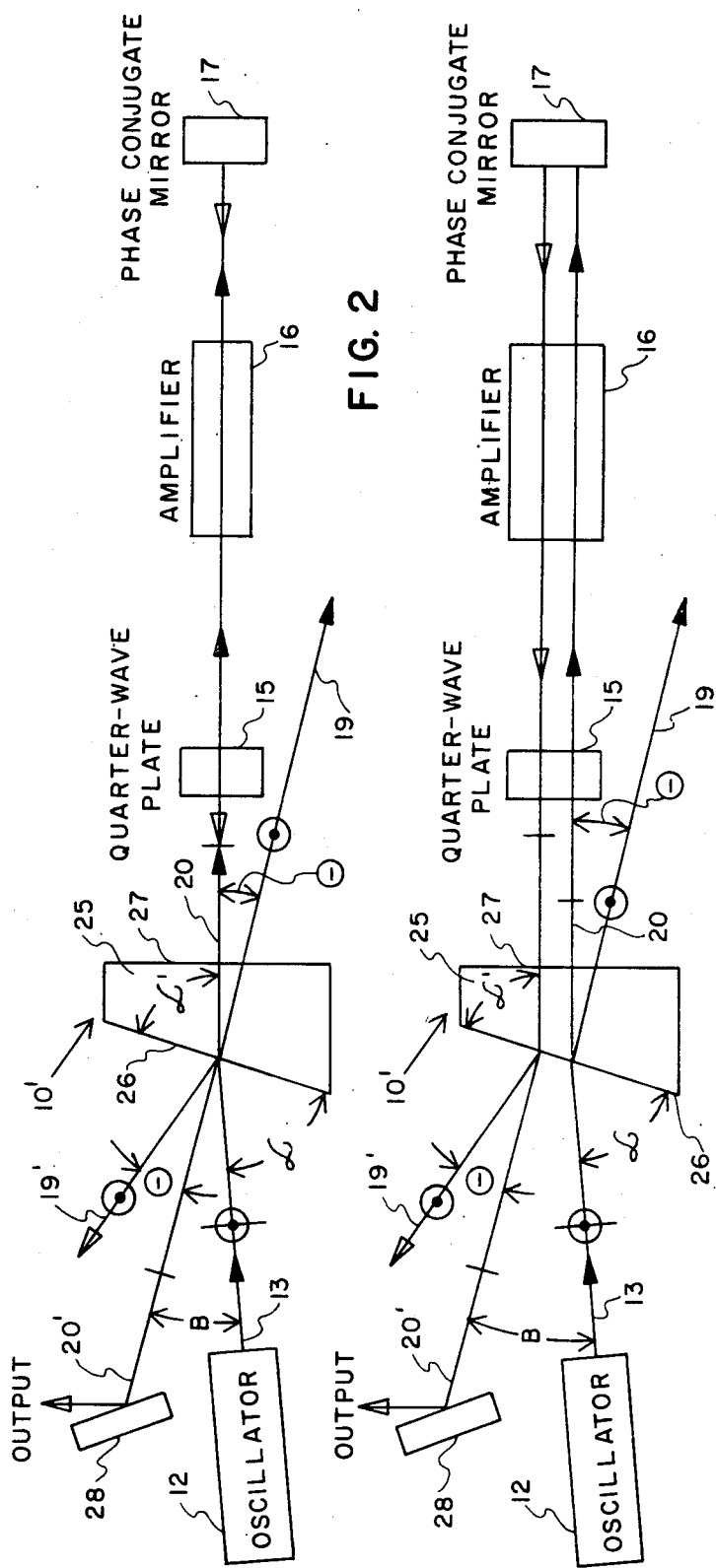
FIG. 1 PRIOR ART
FIG. 2
FIG. 3

APPARATUS FOR AND METHOD OF EXTRACTING AN OUTPUT BEAM FROM A LASER SYSTEM

RELATED APPLICATION

This is a continuation-in-part of Ser. No. 812,448, filed Dec. 30, 1985 and now abandoned.

BACKGROUND OF THE INVENTION

This invention relates to lasers and more particularly to apparatus for and a method of extracting an output beam from a laser system which utilizes a phase conjugate mirror.

The marriage of phase conjugation to a laser system is a recent phenomenon in the field of nonlinear optics and laser physics. A detailed analysis and description of this phenomenon is presented in an article entitled *"THROUGH THE LOOKING GLASS WITH PHASE CONJUGATION"* by Feldman et al., in Los Alamos Science (Fall 1982). The phase conjugate mirror may be used with significant advantage in a master oscillator power amplifier system in which the output of the oscillator is amplified by a double pass through highly pumped laser rods utilizing reflection from such a mirror. The advantage is that the phase conjugate mirror eliminates phase distortions in the beam caused primarily by the amplifier and thus enhances the quality of the reflected beam even when amplified to high energy levels and pulsed at high pulse repetition rates. With a conventional mirror, such phase distortions remain in the beam output from the system.

Another property or characteristic of the phase conjugate mirror is its capability of reflecting the conjugate of the laser beam incident upon it such that the conjugate beam travels along the same path as the incident beam regardless of the angle of incidence. This introduces a problem of extracting the beam output from the system without permitting the conjugate beam or even part of it to propagate back into the master oscillator and damage it. A beam splitter in the path of the conjugate beam will divert some of the latter as a useful output but the undiverted portion that propagates through the beam splitter passes into the oscillator and may damage it. This occurs even with coated beamsplitters because of the inefficiencies of such coatings and the amplified level of the conjugate beam.

This invention is directed to a solution to this problem.

OBJECTS AND SUMMARY OF THE INVENTION

A general object of this invention is the provision of improved apparatus for extracting a phase conjugate beam from a master oscillator power amplifier system without damage to the oscillator.

A further object is the provision of a method of so extracting such a beam.

These and other objects of the invention are achieved by using in such a system a birefringent medium for converting the conjugate beam into linearly polarized rays and refracting them at different angles to the beam propagation path away from the master oscillator, one of such rays constituting the system output.

BRIEF DESCRIPTION OF THE DRAWINGS

For a better understanding of the invention as well as other objects and further features thereof, reference is made to the following description which is to be read in conjunction with the accompanying drawings wherein:

FIG. 1 is a schematic block diagram of a master oscillator power amplifier laser system showing a prior art technique for extracting an output from the system.

FIG. 2 is a schematic block diagram of a similar laser system showing an output extracting technique embodying the invention.

FIG. 3 is a diagram similar to that of FIG. 2 with the oppositely propagating laser beams shown artificially spaced apart for clarity of explanation.

DESCRIPTION OF THE PREFERRED EMBODIMENT

Figure 4:
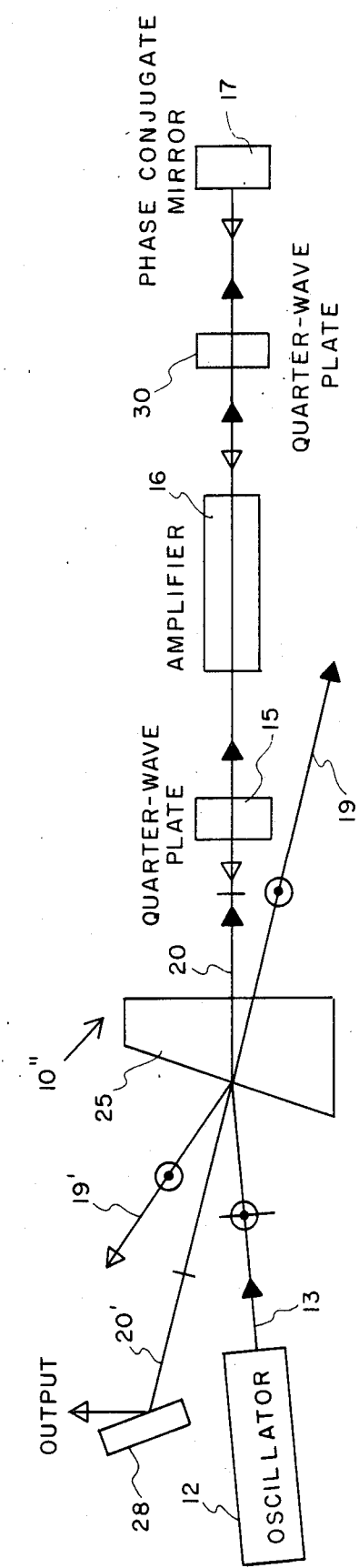
FIG. 4 is a diagram similar to FIG. 2 showing another form of the invention.

Referring now to the drawings, a prior art master oscillator power amplifier laser system 10 is shown in FIG. 1. It includes a master oscillator 12 such as a flashlamp-pumped neodymium/yttrium-aluminum-garnet rod contained with an electro-optic or acousto-optic Q-switch within a resonator formed by multi-layer dielectric mirrors. It generates an unpolarized output beam 13 propagating to the right as viewed and as indicated by solid arrows. Such light is generally, but not necessarily, partially polarized with the major portion thereof being in a desired polarization orientation. It is designated in the drawings by a circle around a dot bisected by a vertical line; vertically polarized light is represented simply by a vertical line through the beam line. Horizontally polarized light has its polarization perpendicular to that of vertically polarized light and, for purposes of illustration, extends into the plane of the paper. It is denoted by a circle surrounding a dot. The remainder of the system 10 consists of a polarizer 14, such as a Nicol prism, a quarter-wave plate 15, a laser power amplifier 16 and a phase conjugate mirror 17.

Beam 13 passes through polarizer 14 which converts the partially polarized light to an ordinary component or ray 19 (O-ray) polarized horizontally as shown and an extraordinary ray 20 (E-ray) having a vertical polarization. Ray 19 is not generally used as the system output and, therefore, is reflected out of the system by the polarizer. E-ray 20 passes through the polarizer without any change in the direction of propagation. Ray 20 then passes through quarter-wave plate 15, which converts the ray to a circular polarization, and through amplifier 16, which increases the beam intensity as well as possibly introducing some depolarization. The output of amplifier 16 is then reflected back along the same or incident path by phase conjugate mirror 17 for a second pass through amplifier 16, which again increases the beam intensity and again possibly introduces some amount of depolarization. The reflected beam then traverses quarter-wave plate 15 which normally polarizes the beam, except for the component depolarized as a result of the two passes through amplifier 16. Polarizer 14 separates the polarized ray into two orthogonal components, one of which is reflected out of the polarizer as indicated at 22 as the useful output of the system. The other component (resulting from the amplifier-induced depolarization) passes through the polarizer, as indicated by the arrow 23, and enters oscillator 12 which may be damaged by this action. This is the principal disadvantage of this system.

In accordance with this invention, laser system 10' is the same as system 10 except that polarizer 14 is replaced with a birefringent medium 25, such as a calcite prism or wedge, see FIGS. 2 and 3, (like reference characters indicating like parts in the drawings). Prism 25 has a plane surface 26 proximate to oscillator 12 and extending at an acute angle α to the direction of propagation of oscillator output beam 13 and acute angle α' relative to the reflected ray from quarter-wave plate 15. Prism 25 also has a planar surface 27 proximate to quarter-wave plate 15 and extends normal to the direction of propagation of E-ray 20. The orientation of surfaces 26 and 27 could be reversed in angle without changing the effectiveness of the invention as long as the prismatic shape is retained. The E-ray 20 exits from medium 25, traverses amplifier 16 and is reflected from mirror 17.

In operation, the partially polarized oscillator output beam 13 is incident on surface 26 of birefringent medium 25, see FIG. 3, which separates the beam into orthogonally polarized components indicated as O-ray 19 (wasted energy) and E-ray 20 (the major useful component characteristic of prism 25 and the incident angle α of beam 13 with surface 26, rays 19 and 20 propagate through prism 25 and exit from surface 27 thereof with an angle θ between the rays. O-ray 19 is diverted out of laser system 10' and E-ray 20 continues propagating toward mirror 17 through quarter-wave plate 15 and power amplifier 16. Ray 20 is reflected from phase-conjugate mirror 17 precisely along the entering path (as shown in FIG. 2) through the partially-depolarizing amplifier 16, plate 15 and birefringent medium 25. The birefringent medium 25 again divides the ray into orthogonally polarized O-ray 19' and E-ray 20'. They exit from medium surface 26 at an angle θ with each other and, more importantly, at angles $\beta+\theta$ and $\beta$, respectively, with the propagation path of oscillator output beam 13. Thus both rays 19' and 20' are directed away from oscillator 12 so that none of the reflected light enters the oscillator. O-ray 19' is diverted out of the system and E-ray 20' is reflected off output mirror 28 as the useful output of the system. While there is some loss of power by use of only one of the two rays exiting form each of surfaces 26 and 27 of medium 25, the loss is readily compensated by adjustment of the power level of amplifier 16.

FIG. 4 illustrates another laser system 10" which is the same as system 10' except for the addition of a second quarter-wave plate 30 between amplifier 16 and mirror 17; like reference characters indicate like parts on the drawing. This second plate 30 tends to compensate the depolarizing effects of amplifier 16 on the beam incident on and reflected from mirror 17 and accordingly improves the efficiency of the apparatus in diverting the return beam away from oscillator 12. In other respects, system 10" operates the same as system 10'.

Figure 5:
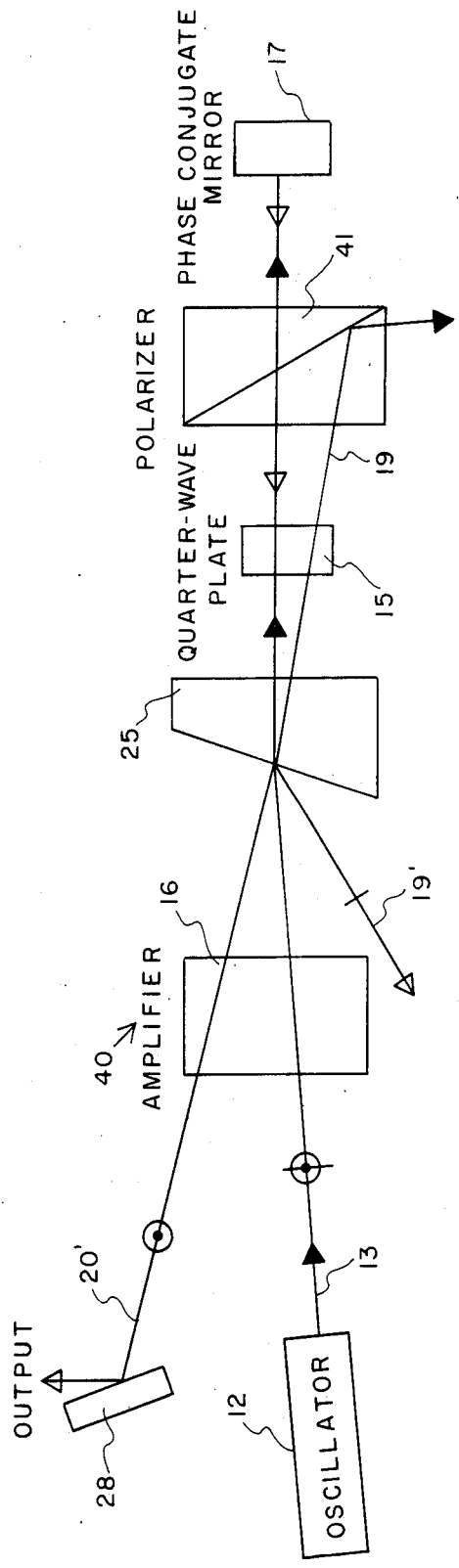
FIG. 5 is a diagram similar to FIG. 2 showing still another form of the invention.

FIG. 5 shows still another embodiment of the invention comprising apparatus 40 in which beam amplifier 16 is positioned between oscillator 12 and birefringent medium 25 and a linear polarizer 41, similar to polarizer 14 in FIG. 1, is located between quarter-wave plate 15 and mirror 17. In other respects, the components of apparatus 40 are the same as those described above, like reference characters indicating like parts on the drawings. By locating amplifier 16 as shown in FIG. 5, its depolarizing characteristic has minimal or inconsequential effect on the operation of the system because the forward traveling ray from oscillator 12 is appropriately amplified while the phase conjugated backward travelling ray also undergoing amplification is uneffected due to amplifier depolrization. This is because the angle of passage through the amplifier is not coincident with the forward going ray path. Also the addition of polarizer 41 between plate 15 and mirror 17 serves to direct out of the system one of the polarized rays so that there is only one ray reflected by mirror 17. The polarization of that ray is such that after passing back through the birefringent medium it does not follow along a coincident path back into oscillator 12. In gross, the oscillator protection efficiency of apparatus 40 compared to apparatuses 10' and 10" is further improved.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. Apparatus for extracting an output beam from a laser system having a laser oscillator with an output, a phase conjugate mirror means spaced from said oscillator and aligned with the output of said oscillator to reflect said oscillator output in a direction back toward the oscillator, amplifying means aligned with said oscillator output between said oscillator and said mirror means, and at least one quarter-wave plate aligned with said oscillator output between said oscillator and said mirror means, the improvement comprising:
    a birefringent element between said plate and said oscillator and having a surface traversing reflected and unreflected portions of said output at acute angles thereto to divert at least part of the reflected portion of said oscillator output away from said oscillator.

2. Apparatus according to claim 1 in which said amplifying means is located between said plate and said mirror means.

3. Apparatus according to claim 2 with a second quarter-wave plate aligned with said oscillator output between said amplifying means and said mirror means.

4. Apparatus according to claim 1 in which said amplifying means is between said oscillator and said birefringent element, said apparatus including a polarizer between said plate and said mirror means.

5. Apparatus for extracting an output beam from a laser system including a laser oscillator having an output, and beam amplifying means, comprising in combination:
    mirror means spaced from said oscillator and aligned with said oscillator output to reflect said oscillator output in a direction back toward said oscillator;
    said amplifying means being positioned between said oscillator and said mirror means in alignment with said oscillator output to amplify said oscillator output;
    a quarter-wave plate disposed between said oscillator and said amplifying means and disposed to be traversed by at least a portion of the oscillator output propagating toward and being reflected from said mirror means; and
    birefrigent means disposed between said quarter-wave plate and said oscillator and traversing said oscillator output to divert the amplified portion of said oscillator output away from said oscillator.

6. Apparatus according to claim 5 in which a second quarter-wave plate is aligned with said oscillator output and is disposed between said amplifier and said mirror.

7. Apparatus according to claim 5 in which said mirror means comprises a phase conjugate mirror.

8. Apparatus according to claim 5 in which said birefringent means is a calcite prism.

9. Apparatus for extracting an output beam from a laser system including a laser oscillator having an output, and beam amplifying means, comprising in combination:
   a phase conjugate mirror spaced from said oscillator and aligned with the output of said oscillator to reflect said output in the same path back toward said oscillator;
   said amplifying means being positioned between said oscillator and said mirror means in alignment with said oscillator output to amplify said output;
   a quarter-wave plate disposed between said amplifying means and said mirror means and positioned to be traversed by at least a portion of said oscillator output propagating toward and being reflected from said mirror means;
   a polarizer disposed between said quarter-wave plate and said mirror means and aligned with said output of said oscillator, and
   a birefringent prism between said amplifying means and said quarter-wave plate, and prism having external plane surfaces traversing said oscillator output and the reflected portion of said oscillator output, respectively, at least one of said surfaces forming an acute angle with said oscillator output and said reflected portion to refract said oscillator output in a direction away from said oscillator.

10. In a system comprising a laser oscillator having an output, a phase conjugate mirror disposed to reflect at least a portion of said output back toward said oscillator, and a quarter-wave plate and a laser beam amplifier in the propagation path of the oscillator output between said oscillator and said mirror, the improvment comprising:
   a birefringent medium disposed between said oscillator and said quarter-wave plate and positioned in the propagation path of said oscillator output and said reflected portion of said oscillator output, said medium having a plane surface disposed at an acute angle to a direction of propagation of said oscillator output and said reflected portion of said oscillator output to refract said reflected portion in a direction away from said oscillator.

11. The system according to claim 10 in which said amplifier is between said quarter-wave plate and said mirror, and a second quarter-wave plate disposed between said amplifier and said mirror in alignment with the propagation path of said oscillator output.

12. The system according to claim 11 in which said medium has a second plane surface opposite said first plane surface, said second surface traversing and being perpendicular to the propagation path of the oscillator output.

13. A method of extracting an output from a laser system having a laser oscillator and a laser beam amplifying system, consisting of the steps of:
   directing the oscillator output through a birefringent prism and producing a first set of orthogonally polarized O and E rays propagating from said prism in different directions;
   passing one of said rays through at least one quarter-wave plate;
   reflecting said one of said rays with a phase conjugate mirror back toward said oscillator through said quarter-wave plate and said prism to form a second set of O and E rays propagating from said prism in different directions away from said oscillator; and
   utilizing one of said second set of rays as said laser system output.

14. The method according to claim 13 with the additional step of amplifying said one set of said rays.

15. A method of extracting the output of a laser system having a laser oscillator and a laser amplifying means, consisting of the steps of:
   directing the oscillator output through said amplifying means and a birefringent prism and producing a first set of orthogonally polarized O and E rays propagating from said prism in different directions;
   passing one of said first set of rays through a quarter-wave plate and a polarizer;
   reflecting said one of said first set of rays with a phase-conjugate mirror back through said polarizer and quarter-wave plate and said prism to form a second set of O and E rays propagating from said prism in different directions away from said oscillator; and
   amplifying one of said second set of rays to produce the output from said laser system.

* * * * *